United States Patent [19]

Kobayashi

[11] Patent Number: 4,776,553
[45] Date of Patent: Oct. 11, 1988

[54] TELEPHONE CRADLE MOUNT

[75] Inventor: Fumiyuki Kobayashi, Tokyo, Japan

[73] Assignee: NEC Corporation, Japan

[21] Appl. No.: 89,150

[22] Filed: Aug. 25, 1987

[30] Foreign Application Priority Data

Aug. 26, 1986 [JP] Japan .......................... 61-130190[U]

[51] Int. Cl.⁴ ....................... F16M 11/00; H04M 1/11
[52] U.S. Cl. .................................... 248/558; 248/371;
248/278; 248/284; 248/DIG. 12; 248/346;
248/645; 379/454; 455/90
[58] Field of Search ............... 248/278, 371, 558, 284,
248/DIG. 11, DIG. 12, 359 E, 346, 152, 148,
149, 661, 645, 676, 397, 398, 138, 126, 127;
379/454, 56, 58, 447; 445/90

[56] References Cited

FOREIGN PATENT DOCUMENTS 1238363 4/1967 Fed. Rep. of Germany ...... 248/278
0018249 1/1986 Japan .................................. 379/454

Primary Examiner—Alvin C. Chin-Shue
Attorney, Agent, or Firm—Laff, Whitesel, Conte & Saret

[57] ABSTRACT

A telephone cradle mount comprises a mounting member for mounting a telephone cradle and a fixing member, each of the mounting and fixing members comprises a generally rectangular mounting plate section, a first and second stationary bearing sections each provided on and perpendicularly to the mounting plate section and extending along, one of first opposite sides of the mounting plate section and one of second opposite sides whicha are perpendicular to the first opposite sides, the first and second stationary bearing sections being provided with a first and a second opening, respectively, and a rotatable bearing section having a third opening and rotatable such that the third opening selectively becomes aligned with the first and second openings.

7 Claims, 7 Drawing Sheets

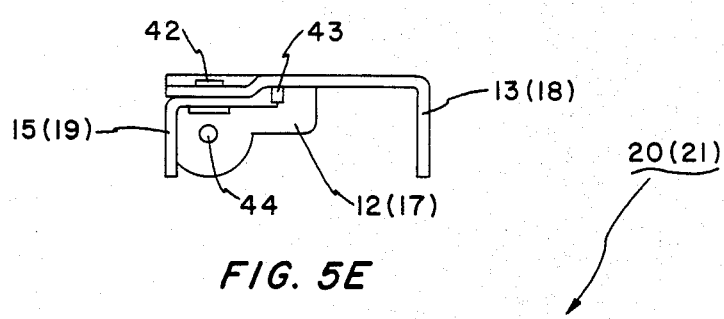
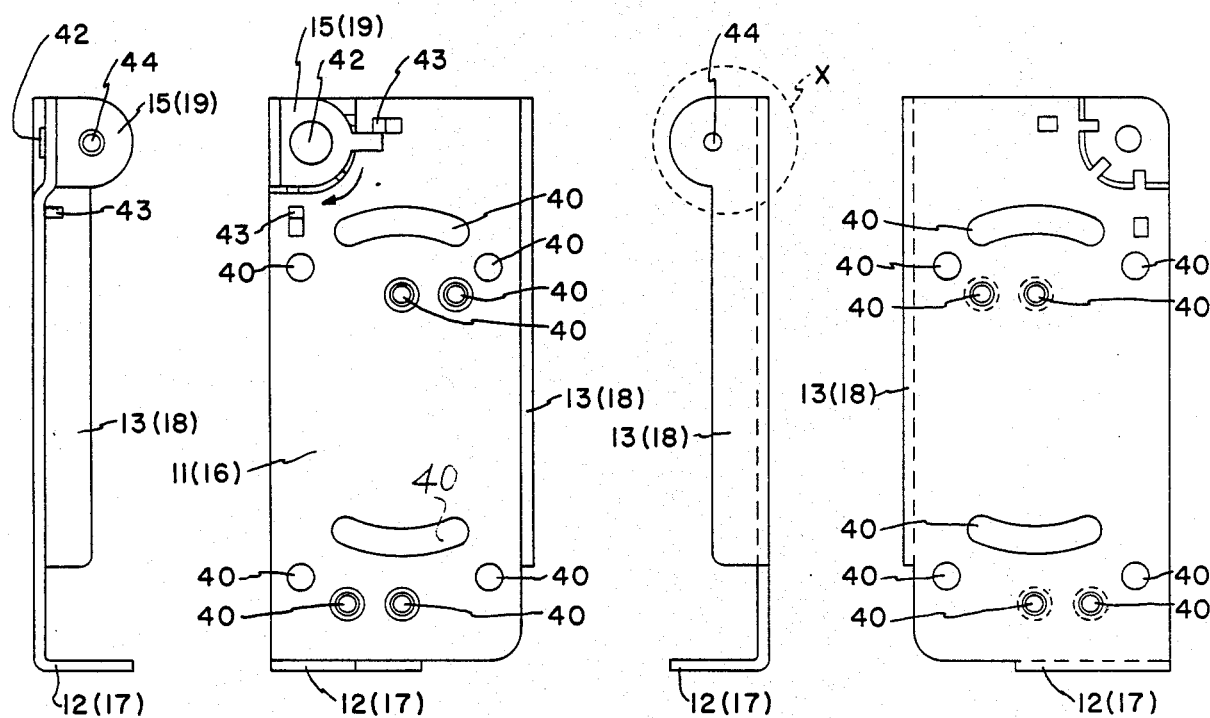
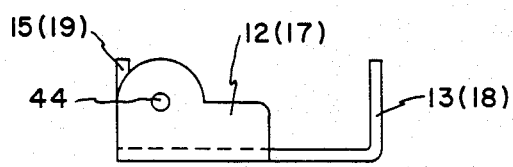
FIG. 5E
FIG. 5C    FIG. 5A    FIG. 5D    FIG. 5B
FIG. 5F

4,776,553

TELEPHONE CRADLE MOUNT

BACKGROUND OF THE INVENTION

The present invention relates to a mount for mounting a cradle of a telephone such as a vehicle telephone.

A prior art mount of the kind described includes a mounting member for mounting a telephone cradle, a fixing member for fixing the mounting member to the body of a vehicle, and a pin for interconnecting bearing sections which are rigidly provided on the mounting and fixing members. Such a configuration allows a telephone to be mounted in a desired angular position. However, since this prior art mount cannot be opened and closed except in one direction, end portions of the mounting member become uncovered depending upon the relative angular position of the mounting member and the cradle, e.g., when the mounting member and the cradle are oriented to cross each other. Such uncovered end is not only dangerous but also undesirable from the viewpoint of space-saving and design of a vehicle compartment.

To prevent the end portions of the mounting member from being exposed, each of the mounting and fixing members may be provided with a bearing section at each of its four corners such that the mount is selectively openable in two directions which are perpendicular to each other, as needed. However, a drawback with this implementation is that those bearing portions which are not used interfere with the opening and closing movements, limiting the opening and closing angle available.

SUMMARY OF THE INVENTION

It is, therefore, an object of the present invention to provide a telephone cradle mount which allows desired direction and angle of opening and closing movements to be set up with ease.

It is another object of the present invention to provide a telephone cradle mount which prevents its end portions from becoming uncovered even when a telephone is mounted crosswise.

It is another object of the present invention to provide a telephone cradle mount which is openable over a sufficient angle.

It is another object of the present invention to provide a telephone cradle mount which prevents the mounting angle of a telephone from being easily changed by shocks and impacts.

It is another object of the present invention to provide a telephone cradle mount which is suitable for mass production.

According to one aspect of the present invention, there is provided a telephone cradle mount comprising a mounting member for mounting a telephone cradle and a fixing member. Each of the mounting and fixing members comprises a generally rectangular mounting plate section. A first and a second stationary bearing sections are provided on and perpendicular to the mounting plate section and extending along, respectively, one of first opposite sides of the mounting plate section and one of second opposite sides which are perpendicular to the first opposite sides. The first and second stationary bearing sections are provided with a first and a second opening, respectively. A rotatable bearing section has a third opening and is rotatable so that the third opening selectively becomes aligned with the first and second openings.

According to another aspect of the present invention, a telephone cradle mount comprises a generally rectangular first member for mounting the cradle. A second member is provided with a shape which is the same as the shape of the first flat member for mounting the mount to a predetermined body. Each of the first and second members comprises a first stationary bearing section which is provided on and perpendicular to one of the opposite sides and provided is with a first opening at one end of the first stationary bearing section. A second stationary bearing section is provided on and perpendicularly to one of the opposite sides which are perpendicular to the opposite sides and are provided with a second opening at one end of the second stationary bearing section. A rotatable bearing section is provided at and perpendicular to a corner where first and second stationary bearing sections are provided join each other. The rotatable bearing section has a third opening through a perpendicular portion thereof. The rotatable bearing portion is rotatable so that the perpendicular portion becomes parallel to the first and second stationary bearing sections. The mount further comprises male screws for selectively interconnecting the rotatable bearing sections and the first or second stationary bearing sections which are engaged with each other when the rotatable bearing portions of the first and second flat members are oriented in the same direction with respect to each other, with the first and second flat members facing each other.

BRIEF DESCRIPTION OF THE DRAWINGS

The above and other objects, features and advantages of the present invention will become more apparent from the following detailed description taken with the accompanying drawings in which:

FIGS. 5A to 5F are views of a mounting member or a fixing member of the mount held in the condition of FIG. 1 and seen in six different directions;

DETAILED DESCRIPTION OF THE PREFERRED EMBODIMENTS

Figure 1:
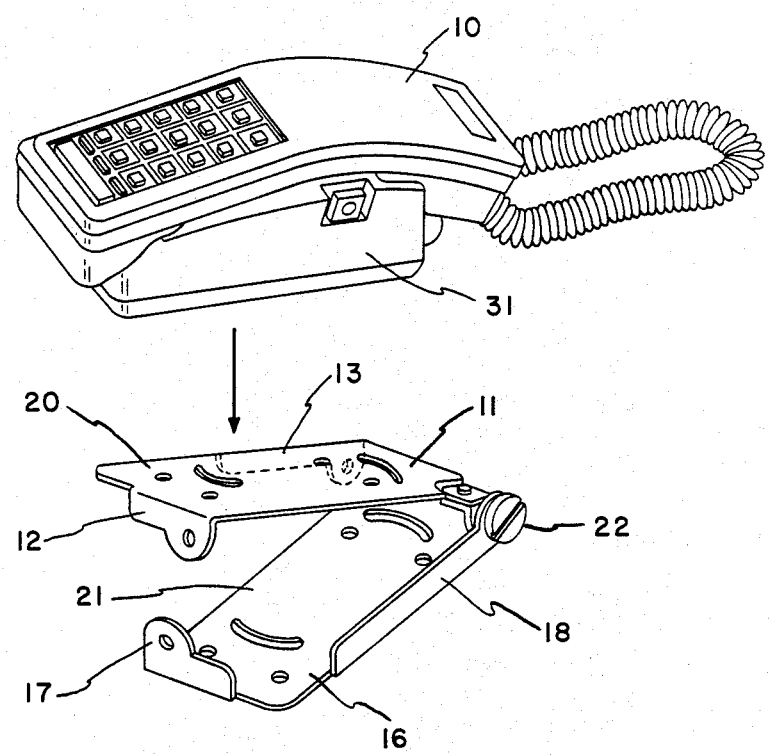
FIGS. 1 and 2 are, respectively, a perspective view and an exploded perspective view of a telephone cradle mount embodying the present invention, which is configured to be openable in a lengthwise direction.
Figure 2:
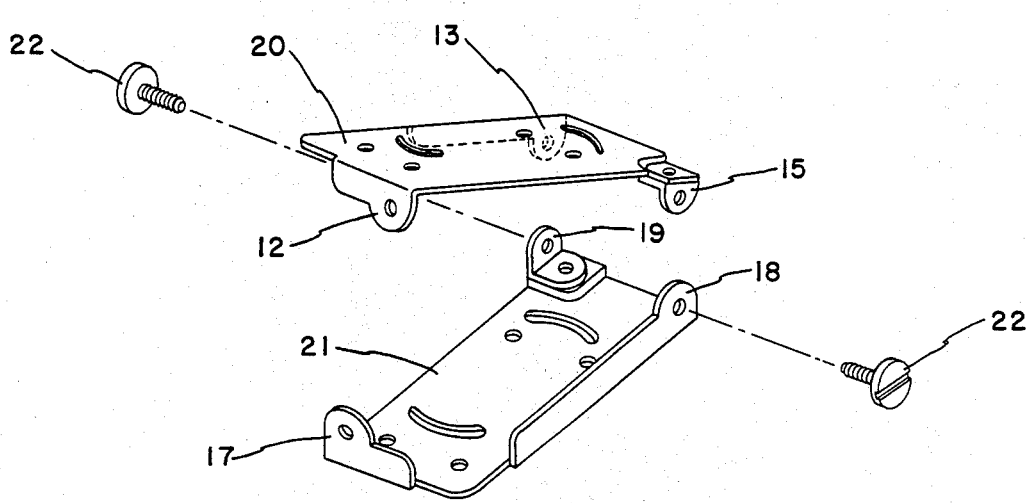

Referring to FIGS. 1 and 2, a telephone cradle mount embodying the present invention is configured to be openable in a lengthwise direction is shown. Also shown in FIG. 1 are a telephone handset 10 and a cradle 31.

The mount includes a mounting plate section 11 for mounting the cradle 31, stationary bearing sections 12, 13, 17 and 18, rotatable bearing sections 15 and 19, a fixing plate section 16, a mounting member 20, a fixing member 21, and two screws 22 (only one is shown).

The rotatable bearing section 15 is connected to the mounting member 20 to swing 90 degrees relative to the mounting member 20. In this particular embodiment, the rotatable bearing section 15 is oriented so that the general plane of its bent and raised upright portion extends in the same direction that the stationary bearing section 18 extends. Likewise, the rotatable bearing section 19 is connected to the mounting member 21 to swing over 90 degrees and includes a bent and raised upright portion whose general plane extends in the same direction that of the stationary bearing section 13 extends. The rotatable bearing section 15 and the stationary bearing section 18 are connected by the screw 22. Likewise, the rotatable bearing section 19 and the stationary bearing section 13 are connected together by a screw, not shown.

After the mounting member 20 has been positioned at any desired angle within the range of 0 to 90 degrees relative to the fixing member 21, the two screws 22 are fastened to fix the members 20 and 21 at the desired angle. As will be described in detail later, the rotatable bearing sections 15 and 19 and the stationary bearing sections 18 and 13 are shaped to mesh with each other. This prevents the angular position of the member 20 relative to the member 21 from being easily changed after the screws 22 have been fastened.

The cradle 31 is mounted on the mounting plate section 11 of the mount 20 as indicated by an arrow. On the other hand, the fixing plate section 16 of the mount 21 is fixed to the body of a vehicle.

Figure 3:
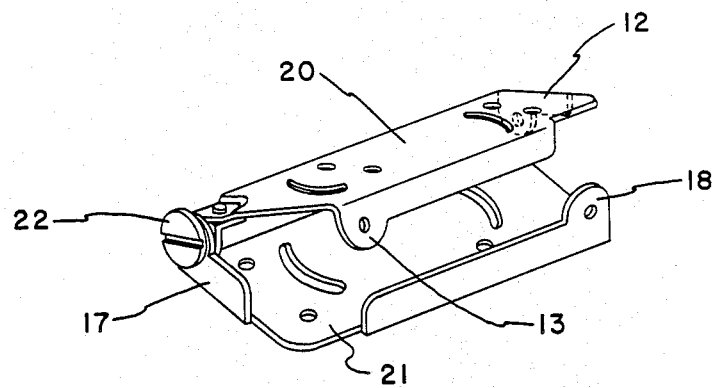
FIGS. 3 and 4 are views similar to FIGS. 1 and 2, respectively, showing the mount of the present invention which is configured to be openable in a direction perpendicular to the opening direction as shown in FIG. 1.
Figure 4:
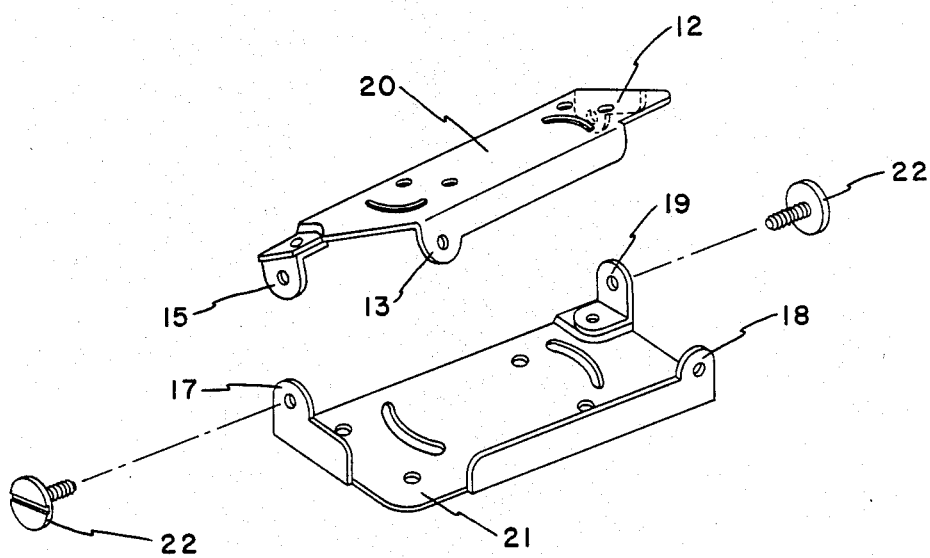
Figure 6D:
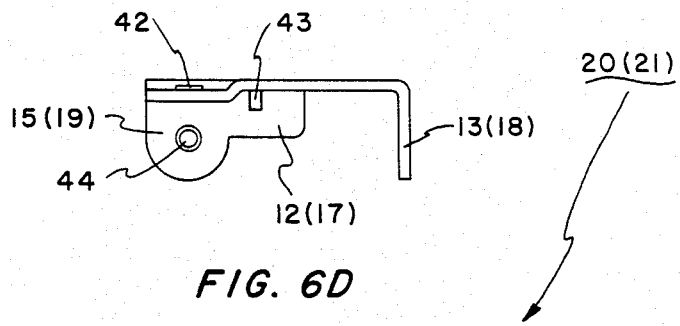
FIGS. 6A to 6E are views of the mounting member or the fixing member of the mount held in the condition of FIG. 3 and seen in five different directions.
Figure 6B:
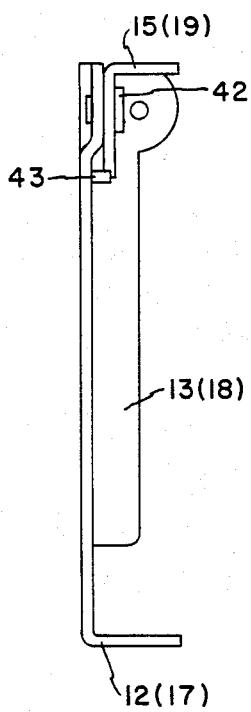
Figure 6A:
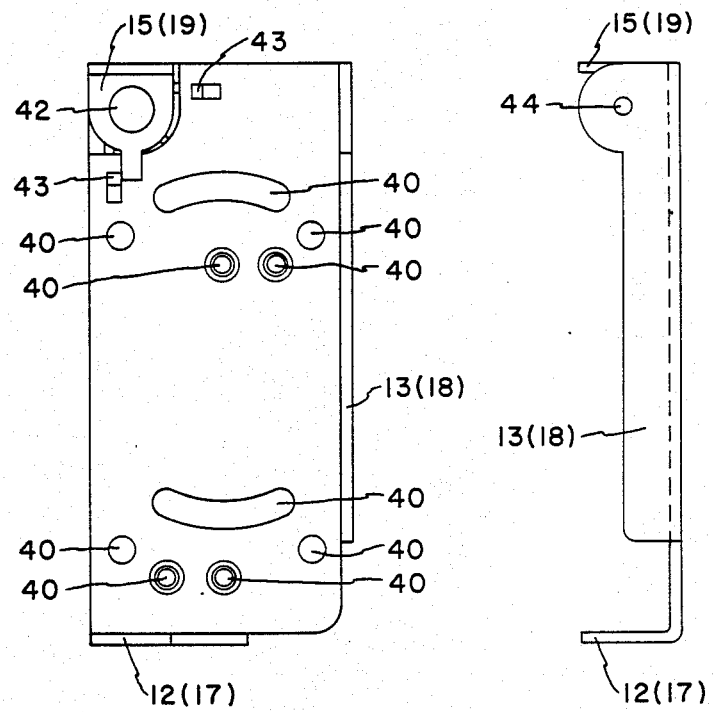
Figure 6C:
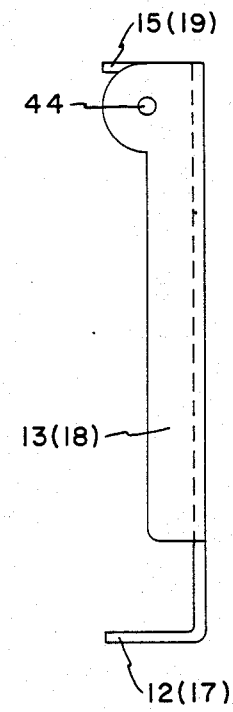
Figure 6E:
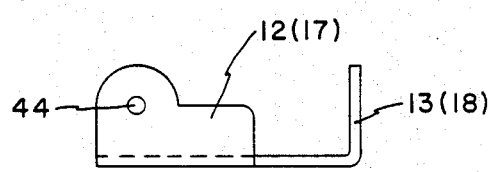

Referring to FIGS. 3 and 4, the mount in accordance with the present invention is shown in another specific position in which it is openable in a direction perpendicular to the opening direction as shown in FIGS. 1 and 2. Specifically, the mounting member 20 and the fixing member 21 are put together after rotating the mounting member 20 by 180 degrees relative to the fixing member 21 and by rotating the rotatable bearing sections 15 and 19 by 90 degrees, respectively. In this configuration, the mountingmember 20 can be opened and closed perpendicularly to the mounting member 20 of FIG. 1.

In any of the configurations shown in FIGS. 1 to 4, those of the stationary bearing portions 12, 17, 13 and 18 which are not used, are located on the side which is opposite to the side where the screws 22 are positioned. Those bearing sections which are not used do not abut against each other when the mounting member 20 and fixing member 21 are closed. Thus, they do not interfere with the opening and closing movements of the member 20. It is to be noted that the mounting member 20 and fixing member 21 have exactly the same shape.

The structure of the mounting member 20 and fixing member 21 will be described in more detail with reference to FIGS. 5 to 9.

FIGS. 5A to 5F shows the mounting member 20 or the fixing member 21 of FIG. 1 as viewed in six different directions. Specifically, FIGS. 5A, 5B, 5C, 5D, 5E and 5F are a plan view, a back view, a side elevation as seen from the left, a side elevation as seen from the right, a rear end view, and a front end view, respectively.

As shown and previously stated, the mounting member 20 (FIG. 1) (or fixing member 21) includes the mounting plate section 11 (or fixing plate section 16) which is provided with a plurality of openings 40 (FIG. 5). These openings 40 are used to fix the associated member 11 (16) to the cradle or to the vehicle body. The stationary bearing sections 13 (or 18) and 12 (or 17) respectively extend from one of opposite longer sides and one of opposite shorter sides of the mounting plate section 11 (or fixing plate section 16) along and perpendicularly to the latter. The rotatable bearing section 15 (or 19) is positioned in the vicinity of that corner of the plate section 11 (or 16) where the other sides which lack the stationary bearing sections 13 and 12 (or 18 and 17) join each other. The rotating bearing section 15 (or 19) is rotatable 90 degrees about a pin 42 as indicated by an arrow in FIG. 5A and, in FIG. 5A. In the configuration shown in FIGS. 1 and 2, section 15 (19) positioned such that the general plane of its upright portion extends parallel to the plane of the stationary bearing section 13 (or 18). A stop 43 is provided for positively positioning the plane of the upright portion of the rotatable bearing section 15 (or 19) parallel to the position of the stationary bearing section 13 (or 18). Each of the rotatable bearing section 15 (or 19) and the stationary bearing section 13 (or 18) is provided with an opening 44 in which the screw 22 (FIG. 2 or 4) may be for openably connecting the members 20 and 21.

FIGS. 6A to 6E shows the mounting member 20 (or fixing member 21) of FIG. 3 as viewed in five different directions. Specifically, FIGS. 6A, 6B, 6C, 6D and 6E are, respectively, a plan view, a side elevation as seen from the left, a side elevation as seen from the right, a rear end view, and a front end view. The back view is omitted since it is the same as the back view of FIG. 5B. As shown, the rotatable bearing section 15 (or 19) is rotated 90 degrees from the position of FIG. 5A so that the plane of the upright portion thereof extends parallel to the upright portion of the stationary bearing section 12 (or 17). In this configuration, the mounting member 20 is openable in the manner shown in FIG. 3.

Figure 7C:
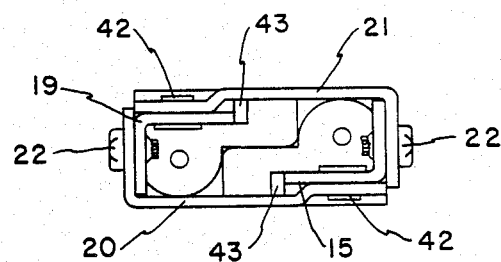
FIGS. 7A to 7D are views of the mount in which the mounting member and fixing member are put together with their rotatable bearing sections positioned as shown in FIG. 5, FIGS. 7A–7D being seen in four different directions.
Figure 7B:
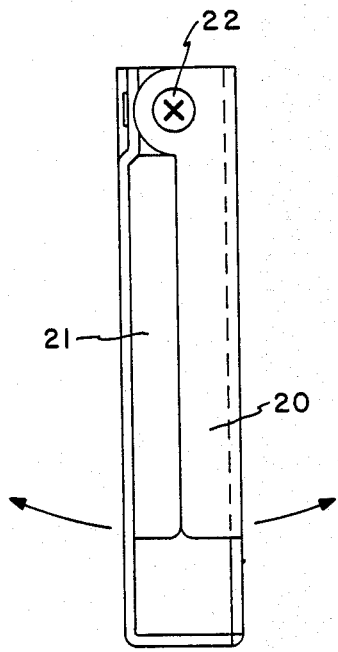
Figure 7A:
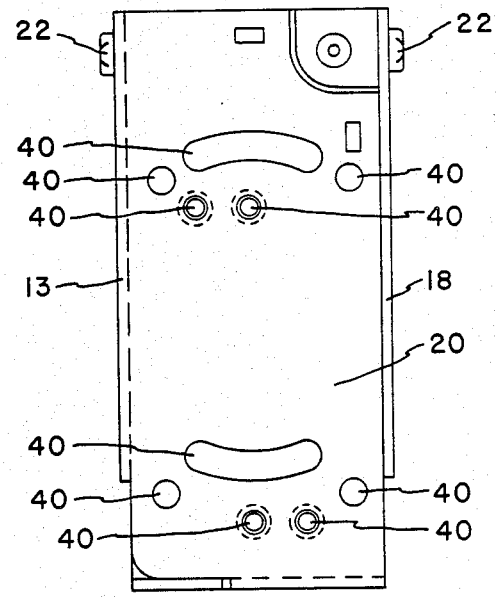
Figure 7D:
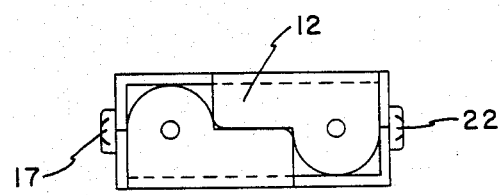

FIGS. 7A to 7D, show the mount in which the mounting member 20 and the fixing member 21 are assembled with the rotatable bearing sections 15 and 19 conditioned as shown in FIG. 5. Specifically, FIGS. 7A, 7B, 7C and 7D show the mount in a plan view, a side elevation as seen from the left, a rear end view, and a front end view, respectively. The mounting member 20 and the fixing member 21 are angularly movable toward and away from each other, with turning about the screws 22 and over a rangeof 0 to 90 degrees, as indicated by an arrow in FIG. 7B. The screws 22 may be tightened to fix the members 20 and 21 at a desired angular position. When the angular distance between the members 20 and 21 is zero, the stationary bearing sections 12 and 17, which are not used, do not interfere with the opening and closing movements because they are located at the side opposite the screws 22 and, as shown in FIG. 7D, configured not to abut against each other.

Figure 8A:
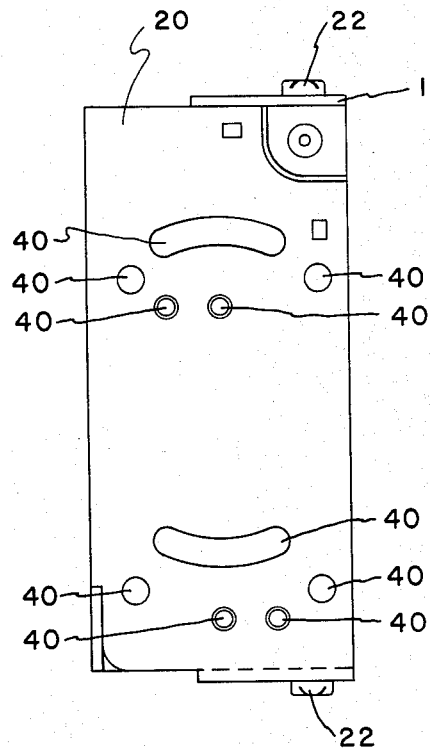
FIGS. 8A to 8D are views of the mount in which the mounting member and fixing member are put together with the rotatable bearing sections positioned as shown in FIG. 6, FIGS. 8A–8D being viewed in four different directions.
Figure 8B:
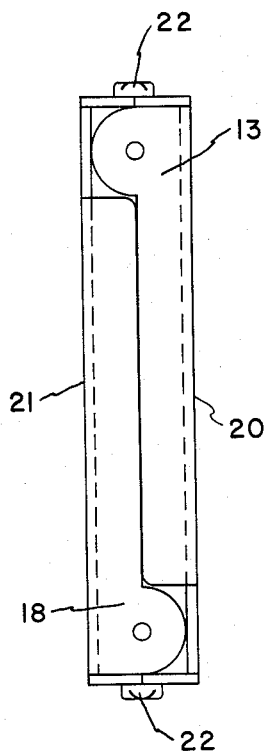
Figure 8C:
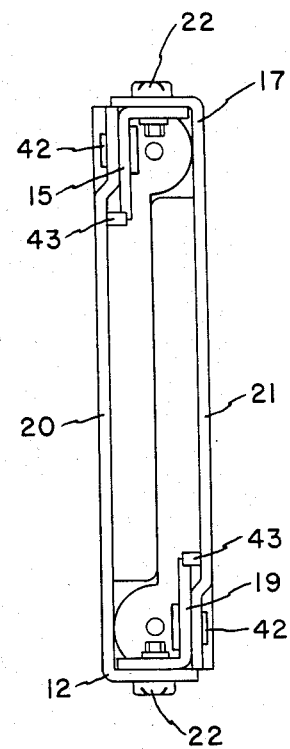
Figure 8D:
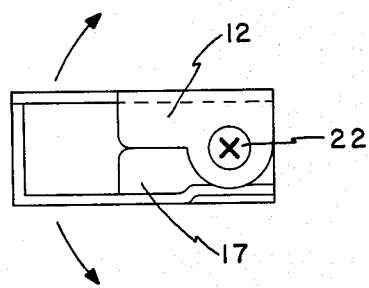

FIGS. 8A to 8D shows the mount in which the mounting member 20 and the fixing member 21 are assembled with the rotatable bearing sections 15 and 19 held in the condition shown in FIG. 6. Specifically, FIGS. 8A, 8B, 8C and 8D are, respectively, a plan view, a side elevation as seen from the left, a side elevation as seen from the right, and a front end view. In FIG. 8, as in FIG. 7, the mounting member 20 and the fixing member 21 are angularly movable toward and away from each other about the screws 22 and over a rage of 0 to 90 degrees, as indicated by an arrow in FIG. 8D. The members 20 and 21 are fixed in a desired angular position by fastening the screws 22. The stationary bearing sections 13 and 18 which are not used are located at the opposite side to the screws 22 and, as shown in FIG. 8B, aligned with each other. Again, this prevents bearing sections 13 and 18 from interfering with the opening and closing movements of the members 20 and 21.

Figure 9A:
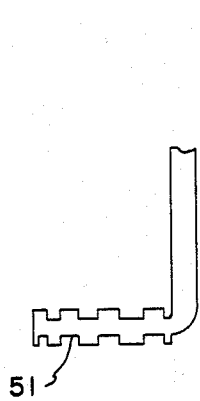
FIGS. 9A and 9B are views of a stationary bearing section, as seen in two different directions.
Figure 9B:
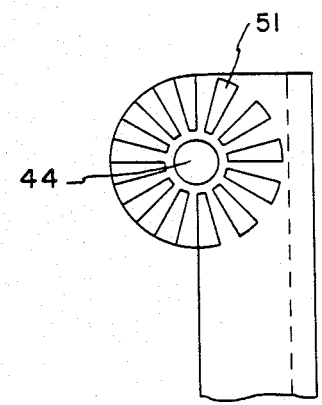
Figure 10C:
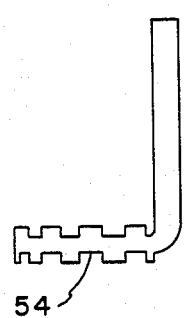
FIGS. 10A to 10C are views of the rotary bearing section as seen in three different directions.
Figure 10A:
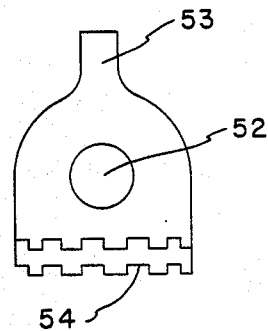
Figure 10B:
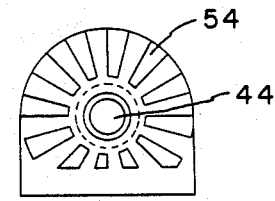

A reference will be made to FIGS. 9A to 9B and 10A to 10C for describing the stationary and rotatable bearing sections in further detail. Specifically, FIGS. 9A and 9B are, respectively, an enlarged front view and an enlarged side elevation of the stationary bearing section, as indicated by dotted line X in FIG. 5D. It is to be noted that the portion X of FIG. 5D is common to all the stationary bearing sections 12, 13, 17 and 18. FIGS. 10A, 10B and 10C are, respectively, a plan view, a front end view, and a side elevation as seen from the left, each showing the rotatable bearing section 15 or 19 in an enlarged scale.

In FIGS. 9 and 10, the stationary bearing sections 12, 13, 17 or 18 includes an undulated portion 51 while the rotatable bearing section 15 or 19 includes an undulated portion 54. The undulated portions 51 and 54 are meshed with each other to set up a desired angle between the mounting plate 20 and the fixing plate 21. The undulated portions 51 and 54 are firmly fixed in place by the screw 22 which attends through the opening 44. This arrangement prevents the mounting angle of the telephone 10 from being easily changed by shocks and impacts. Further, an opening 52 is provided so that a fixing pin 42, FIG. 5, may pass therethrough. The extreme end 53 of the rotatable bearing section 15 or 19 is shaped to engage the stop 43.

As described above, in accordance with the present invention, the direction and angle of the opening and closing movements of a mount for a telephone cradle are readily changeable by simply rotating rotatable bearing sections, which are provided one on each of a mounting and a fixing member, and by changing the positions of screws. Since stationary bearing sections which are not used do not interfere with the opening and closing movements of the mount, a sufficient opening and closing angle is guaranteed. Hence, a telephone can be manipulated with unprecedent efficiency. Further, even if the telephone is mounted crosswise, the end portions of the mount do not show themselves. Therefore, the invention promotes space-saving and a pleasant design.

In addition, the mounting member and the fixing member share exactly the same configuration, thus enabling the mount to be produced on a quantity basis and, therefore, at low cost.

What is claimed is:

1. A mount for a telephone cradle, comprising:
 a mounting member for mounting said telephone cradle; and
 a fixing member;
 each of said mounting and fixing members comprising:
 a mounting plate section;
 a first and a second stationary bearing sections each provided on and perpendicularly to said mounting plate section and extending along, respectively, one of first opposite sides of said mounting plate section and one of second opposite sides which are perpendicular to said first opposite sides, said first and second stationary bearing sections being provided with a first and a second opening, respectively, said first opening being perpendicular to said second opening; and
 a rotatable bearing section having a third opening and rotatable such that said third opening selectively becomes aligned with said first and second openings.

2. A mount as claimed in claim 1, wherein each of said first and second stationary bearing sections is provided with a first undulated portion around said first or second opening associated with said stationary bearing section, said rotatable bearing section being provided with a second undulated portion around said third opening and corresponding to said first undulated portions.

3. A mount as claimed in claim 2, wherein said rotatable bearing section comprises a projecting extreme end.

4. A mount as claimed in claim 3, wherein said mounting plate section comprises a stop for stopping rotation of said rotatable bearing section, said stop corresponding to said projecting extreme end.

5. A mount as claimed in claim 1, wherein said mounting plate section of said fixing member is provided with openings for fixing said mounting plate section of said fixing member to a predetermined body.

6. A mount as claimed in claim 5, wherein said predetermined body comprises a vehicle body.

7. A mount for a telephone cradle, comprising:
 a generally rectangular first flat member for mounting said cradle; and
 a second member provided with a same shape as said first flat member for mounting said mount to a predetermined body;
 each of said first and second members comprising:
 a first stationary bearing section provided on and extending perpendicularly to each of said flat members on one of a first of opposite sides and provided with a first opening at one end of said first stationary bearing section;
 a second stationary bearing section provided on and extending perpendicularly to each of said flat members on one of a second of opposite sides which are perpendicular to said first opposite sides and provided with a second opening at one end of said second stationary bearing section; and
 each of said first and second flat members having a rotatable bearing section with a portion perpendicular thereto and mounted at a corner diametrically opposed to the corner where the sides provided with said first and second stationary bearing sections join each other, said rotatable bearing section being provided with a third opening through said perpendicular portion, said selectively rotatable bearing section being rotatable such that said perpendicular portion becomes parallel to said first and second stationary bearing sections;
 said mount further comprising male screws for selectively connecting said rotatable bearing sections and said first or second stationary bearing sections which are engaged with each other when said rotatable bearing sections of said first and second members are oriented in a same direction as each other with said first and second members facing each other.

* * * * *